No. 777,976. PATENTED DEC. 20, 1904.
F. J. REINHOLD.
ICE CUTTING MACHINE.
APPLICATION FILED SEPT. 16, 1903.
NO MODEL. 2 SHEETS—SHEET 1.

WITNESSES
T. G. Massey
Lotta Lee Hayton

INVENTOR
Frank J. Reinhold
By Parker & Burton
Attorneys.

No. 777,976. PATENTED DEC. 20, 1904.
F. J. REINHOLD.
ICE CUTTING MACHINE.
APPLICATION FILED SEPT. 16, 1903.
NO MODEL. 2 SHEETS—SHEET 2.

WITNESSES
T. G. Massey
Lotta Lee Hayton.

INVENTOR
Frank J. Reinhold
By Parker T Burton
Attorneys.

No. 777,976.  
Patented December 20, 1904.

UNITED STATES PATENT OFFICE.

FRANK J. REINHOLD, OF DETROIT, MICHIGAN.

ICE-CUTTING MACHINE.

SPECIFICATION forming part of Letters Patent No. 777,976, dated December 20, 1904.

Application filed September 16, 1903. Serial No. 173,379.

*To all whom it may concern:*

Be it known that I, FRANK J. REINHOLD, a citizen of the United States, residing at Detroit, county of Wayne, State of Michigan, have invented a certain new and useful Improvement in Ice-Cutting Machines; and I declare the following to be a full, clear, and exact description of the invention, such as will enable others skilled in the art to which it pertains to make and use the same, reference being had to the accompanying drawings, which form a part of this specification.

This invention relates to ice-sawing machines, and has for its object an improved machine adapted and intended to produce small square blocks of ice from a larger cake.

Figures 1, 2:
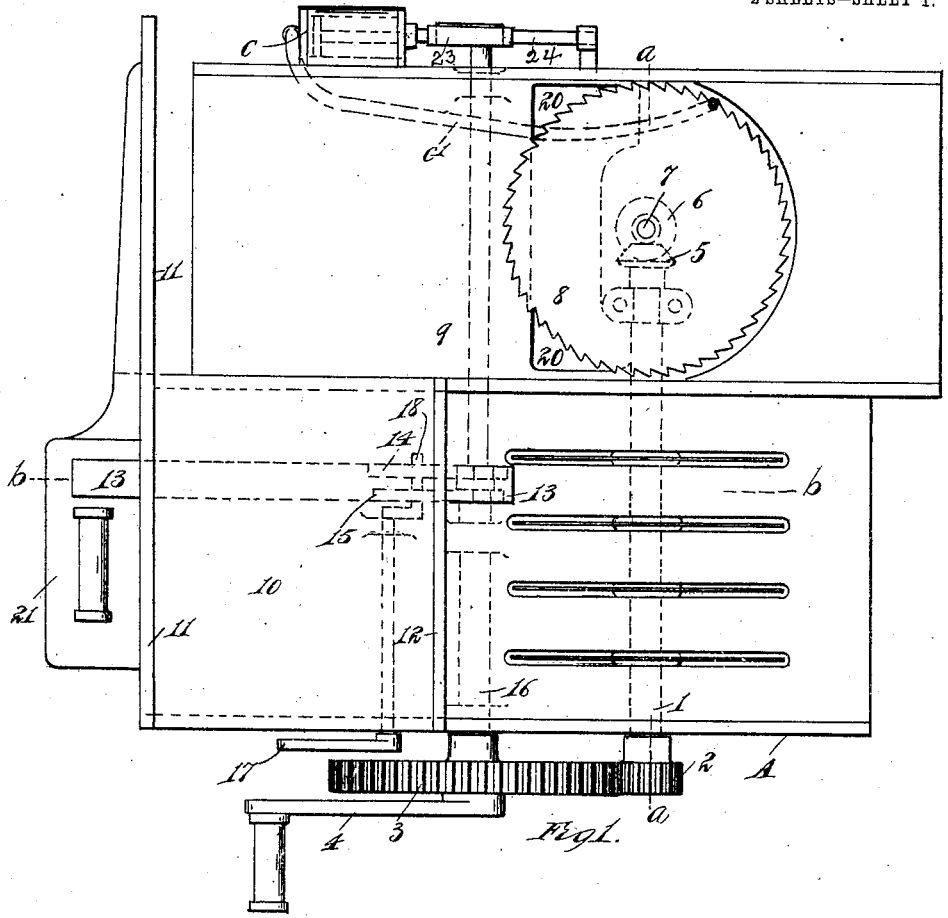
Figure 3:
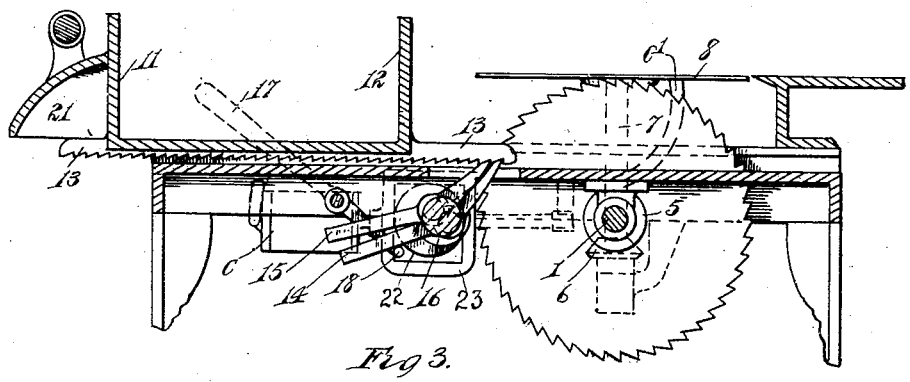
Figure 4:
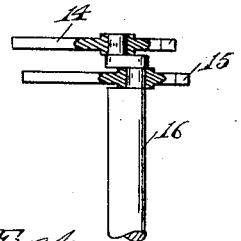

In the drawings, Figure 1 is a plan view. Fig. 2 is a cross-section on line *a a* of Fig. 1. Fig. 3 is a cross-section on line *b b* of Fig. 1. Fig. 4 is a detail of the feed-cranks.

A indicates the face, on which is journaled a shaft 1, provided with a pinion 2, that meshes with a driving master-wheel 3, actuated by a hand-crank 4. The shaft 1 carries a miter-wheel 5, that meshes with a horizontal miter-wheel 6 on the vertical shaft 7 of the horizontal saw 8. The upper surface of the shaft 7 is flush with the face of the saw 8, and the saw stands at an elevation above the table 9 at a distance equal to the thickness of the block of ice which is to be produced. A raised table-surface 10 on the same plane of the saw 8 is arranged to receive the block of ice that is passed over the saw and from the under side of which the finished blocks have been cut.

On the shaft 1 is a gang of saws of any proper number spaced to a distance equal to the thickness of the block of ice that is to be produced. A carriage 19 travels across the table over the shaft 1 and between the members of the gang of saws. This is provided with a receptacle formed of the bottom part of the carriage and vertical sides 11 and 12, which are provided with passages for the saw. On the under side of the carriage is a rack 13, driven by feed-pawls 14 and 15, each of which is actuated by a crank on the shaft 16 of the master-wheel 3. The return movement of the carriage is effected manually, the operator grasping the handle 17, throwing the pawls 14 and 15 out of engagement by means of the rock-lever 18, and drawing the carriage-block.

The particles of ice adhering to the horizontal saw 8 are blown from it by an air-blast produced in an air-pump *c* and conducted from the air-pump *c* through an air-conduit *c'*. The air-pump *c* is secured to the framework and is actuated by an eccentric 22, that rotates in the opening of a cross-head 23 on the piston 24.

No carriage is used with the saw 8, as the block is pushed over it, and the severed blocks of ice fall through the opening 20. A guard 21 covers the openings through the vertical wall 11 and protects the hands of the user from contact with the saws during the last part of the cut and when grasping the carriage for the return thereof.

What I claim is—

1. In an ice-sawing machine, the combination of a gang of rotary saws mounted upon a horizontal shaft whose inner end carries a miter-wheel, a vertical shaft carrying a miter-wheel meshing therewith, a rotary saw mounted on the upper end thereof, a carriage adapted to move above the vertically-rotatable saws, a rack actuated by a pawl mounted on a shaft for moving the same, and means for driving the mechanism, substantially as described.

2. In an ice-sawing machine, in combination with a plurality of rotary saws mounted upon a horizontal shaft and a miter-wheel mounted upon the inner end thereof, a vertical shaft carrying a miter-wheel meshing therewith, a rotary saw mounted on one end thereof, a carriage adapted to receive the block upon leaving the saw, and a feeding mechanism consisting of a rack driven by a pawl eccentrically mounted upon a shaft, and means for driving the mechanism, substantially as described.

3. In an ice-sawing machine, the combination of a vertical shaft, a horizontally-disposed rotary saw, and a miter-wheel mounted thereon with a horizontal shaft carrying a plurality of vertical saws and a miter-wheel on the end of said shaft intermeshing with the corresponding member on the vertical shaft, a carriage adapted to move above the vertical saws, and means for feeding said machine, consisting of a rack driven by a pawl eccentrically mounted on a shaft, means for clearing the saw-teeth of waste matter, and means for driving the mechanism, substantially as described.

In testimony whereof I sign this specification in the presence of two witnesses.

FRANK J. REINHOLD.

Witnesses:
 MAY E. KOTT,
 CHARLES F. BURTON.